United States Patent [19]

Crawford et al.

[11] 4,248,725
[45] Feb. 3, 1981

[54] DISPERSANTS HAVING ANTIOXIDANT ACTIVITY AND LUBRICATING COMPOSITIONS CONTAINING THEM

[75] Inventors: John Crawford, Caterham; Geoffrey A. Hill, Hull, both of England

[73] Assignee: Chevron Research Company, San Francisco, Calif.

[21] Appl. No.: 21,361

[22] Filed: Mar. 19, 1979

[30] Foreign Application Priority Data

Mar. 23, 1978 [GB] United Kingdom ............... 11845/78

[51] Int. Cl.$^3$ .............................................. C10M 1/32
[52] U.S. Cl. .............................. 252/51.5 A; 252/403; 260/326.5 FM
[58] Field of Search ................... 252/51.5 A, 51.5 R, 252/403; 260/326.5 FM, 508, 570.5 P

[56] References Cited

U.S. PATENT DOCUMENTS

| | | | |
|---|---|---|---|
| 3,036,003 | 5/1962 | Verool | 252/51.5 R X |
| 3,368,972 | 2/1968 | Otto | 252/51.5 R X |
| 3,442,808 | 5/1969 | Traise et al. | 252/51.5 A X |
| 3,454,496 | 7/1969 | Schlobohm et al. | 252/51.5 A X |
| 3,455,832 | 7/1969 | Davis | 252/51.5 A |
| 3,493,520 | 2/1970 | Verool et al. | 252/51.5 A |
| 3,634,248 | 1/1972 | Andress, Jr. | 252/51.5 A |
| 3,798,165 | 3/1974 | Piasek et al. | 252/51.5 R |
| 4,066,559 | 1/1978 | Rohde | 252/51.5 A X |

*Primary Examiner*—Andrew Metz
*Attorney, Agent, or Firm*—D. A. Newell; S. R. LaPaglia; V. J. Cavalieri

[57] ABSTRACT

Lubricating oil additives having both dispersant and antioxidant activity, particularly useful for incorporation in two-stroke petrol engine lubricating oil compositions, are produced when a dispersant having free >N-H groups, e.g. a substituted succinimide is reacted with an aldehyde and a compound having antioxidant activity containing in its molecular structure a group or groups capable of condensing with the aldehyde and >N-H groups present in the dispersant, thereby chemically bonding the compound to the dispersant. Representative antioxidants are mononuclear and polynuclear substituted phenols having at least one unsubstituted ortho- or para-position, e.g. 2,6-di-tert-butyl phenol and secondary aromatic amines. Typical reaction conditions are a temperature in the range 100° to 175° C. and atmospheric pressure.

10 Claims, No Drawings

DISPERSANTS HAVING ANTIOXIDANT ACTIVITY AND LUBRICATING COMPOSITIONS CONTAINING THEM

The present invention relates generally to improved oil-soluble lubricating oil additives and, in particular, to an improved oil-soluble lubricating oil additive combining the functions of a dispersant and an antioxidant.

One of the principal problems associated with modern crank case lubricants is that posed by the inevitable presence in the lubricant of foreign particles such as dirt, soot, water and decomposition products resulting from breakdown of the oil. In the presence of water these combine to form a mayonnaise-like sludge, deposition of which presents a serious problem with respect to the efficient operation of the engine. It has for some time been the practice to add to the lubricating oil a dispersant in order to prevent the deposition of sludge. Dispersants are additives which are capable of dispersing the sludge formed in gasoline engines, thereby maintaining the sludge in fine suspension in the lubricating oil in which condition it does not deposit on engine parts such as oil screens, valve train components and oil control rings. Generally dispersants are metal-free organic compounds. The so-called "ashless dispersants", which can be broadly divided into six distinctive groups, as indicated in 'Lubricant Additives' by C V Smalheer and R Kennedy Smith, published by The Lexins-Hiles Co, Cleveland, Ohio, 1967 Edn at page 5.

Another problem associated with lubricating oils is their tendency to deteriorate and lose their ability to function when subjected to oxidation. Since lubricating oils are very often used at high temperatures, the rate of oxidative breakdown can be very rapid. In order to overcome this problem it has long been the practice to incorporate in the lubricating oil an antioxidant.

In recent times, for motor oil and diesel engine applications, a greater load has been put on the dispersant due to the tendency to reduce ash in the formulation, with a consequent reduction in alkalinity value (A.V.). The consequence of this is that larger proportions of dispersant, which are themselves subject to extensive oxidation, are being incorporated in the lubricating oil. One answer to the oxidation problem would be to increase the amount of antioxidant in the lubricating oil, but this approach cannot be taken too far because commonly used antioxidants are either too volatile or are too insoluble for incorporation at a sufficiently high concentration to be effective over long periods of time.

One method of overcoming the oxidation inhibition problem over an extended time period is to gradually add or dose an antioxidant into the lubricating oil. Thus U.S. Pat. No. 4,066,559 describes a container containing an additive to be added to an oil eg an antioxidant, the container walls being of a material selected to permit the additive to permeate therethrough into the oil to which the antioxidant is to be added. By suitable choice of container material it is possible to provide for increased addition of inhibitor to oil as the temperature of the oil increases.

We have now found that an antioxidant can be gradually added to a lubricating oil in the form of its condensation product with an aldehyde and a dispersant having free =NH groups in its molecular structure, the antioxidant being released by scission of the chemical bonds binding it to the dispersant at the elevated temperatures prevailing in internal combustion engines.

Thus according to the present invention there is provided a lubricating oil additive comprising the product when obtained by reacting a dispersant having free >NH groups in its molecular structure, an aldehyde and a compound having antioxidant activity containing in its molecular structure a group or groups capable of condensing with the aldehyde and =NH groups present in the dispersant, thereby chemically bonding the compound to the dispersant.

A preferred type of dispersant having free =NH groups in its molecular structure is that obtained by reacting a substituted succinic acid having the structural formula:

or a substituted succinic anhydride having the structural formula:

in which structural formulae (I) and (II) the substituent R is a large substantially aliphatic hydrocarbon radical having from 30 to 200 carbon atoms, with at least one-half an equivalent amount of an amine of formula:

in which formula (III) the substituent $R^1$ is a $C_1$ to $C_6$ alkyl radical or hydrogen, at a sufficiently elevated temperature to effect formation of the succinimide and to remove the water formed in the reaction. For convenience the product is generally referred to in the art as a succinimide, which term will hereinafter be employed in this specification.

Preferably the substituent R in the structural formulae (I) and (II) is a large substantially aliphatic hydrocarbon radical having at least 50 carbon atoms. The group R may be either an alkyl or an alkenyl radical. Suitably the group R may be derived from polyolefins such as polyethylene, polypropylene or polybutylene although they may be derived from any substantially aliphatic hydrocarbon. Preferably the group R is a polyisobutylene group.

The substituted succinic acids and anhydrides of formulae (I) and (II) are readily available from the reaction of maleic anhydride with a high molecular weight olefin or a chlorinated high molecular weight olefin. The product from such a reaction is the corresponding alkenyl succinic anhydride. The reaction may suitable be effected by heating the reactants at a temperature in the range of from 150° to 200° C. The reactions in each case are illustrated by the following equations:

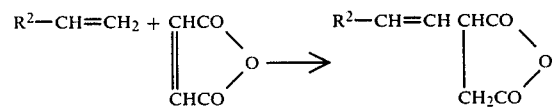

-continued

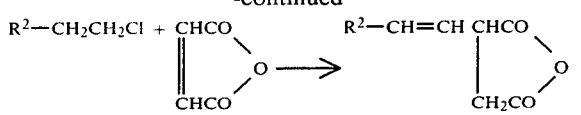

wherein $R^2$—CH=CH— is R in the formulae I and II. It will be appreciated that the above equations are idealised in the sense that side-reactions are possible.

Amines of formula (III) are generally known as ethylene amines. The group $R^1$ may be a $C_1$ to $C_6$ alkyl group but is preferably hydrogen. Suitable amines of formula (III) are ethylene diamine, diethylene triamine, triethylene tetramine and pentaethylene hexamine. Such compounds are well-known in the art and are generally prepared by reacting ethylene dichloride with ammonia. In addition to the pure compounds mixtures of such compounds may also be used.

Whilst at least one half of a chemical equivalent amount of the compound of formula (III) per equivalent of substituted succinic acid or anhydride must be used in the production of the substituted succinimide up to 2.0 chemical equivalents may be used. The chemical equivalency of the amine reactant is based upon the nitrogen content thereof. Thus triethylene tetramine, for example, has four equivalents per mole.

The substituted succinic acid of structural formula (I) or the substituted succinic anhydride of structural formula (II) may suitably be reacted with the amine of formula (III) at a temperature in the range of from 80° to about 200° C., preferably from 100° to 160° C. A preferred method of carrying out the reaction is to add some hydrocarbon solvent eg toluene to the reaction mixture and remove the water formed by azeotropic distillation.

A preferred substituted succinimide useful in the performance of the invention is the bis-succinimide obtained by reacting a substituted succinic anhydride wherein the substituent is derived from a polyisobutene of molecular weight about 1000 with an equimolar amount of triethylene tetramine. Such a substituted succinimide has, theoretically, two amino (>NH) groups available for bonding with the antioxidant. Another preferred succinimide is the mono-succinimide obtained by employing 2 moles of triethylene tetramine in the aforesaid reaction. The mono-succinimide has, theoretically three >N—H groups available for bonding with the antioxidant.

Another class of dispersant having free >N—H groups in its molecular structure is that obtained by reacting a chlorinated high molecular weight olefin, eg polyisobutene, with an ethylene amine of formula (III).

A general class of antioxidants containing in their molecular structure a group capable of condensing with an aldehyde and >NH groups present on the substituted succinimide are mononuclear and polynuclear substituted phenols having at least one unsubstituted ortho- or para-position. A particularly suitable phenol is that having the structural formula:

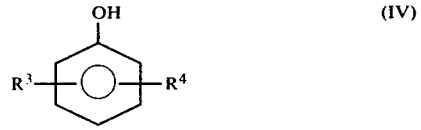

(IV)

wherein $R^3$ and $R^4$, which may be the same or different, are alkyl, cycloalkyl, or aralkyl radicals containing fewer than 13 carbon atoms and may be in the ortho-, meta- or para-position provided that at least one ortho- or para-position is unsubstituted.

Preferably the groups $R^3$ and $R^4$ are alkyl groups, even more preferably tertiary alkyl groups. Preferably the groups $R^3$ and $R^4$ are identical groups. A preferred compound having the formula (IV) is 2,6-di-tert-butyl phenol.

Mononuclear and polynuclear substituted phenols are commercially available chemical compounds.

Another class of antioxidants which may be used in producing the product of the present invention are secondary aromatic amines. Examples of suitable secondary aromatic amines are phenylene diamine derivatives such as N-phenyl-β-naphthylamine, N,N$^1$-di-(naphthyl-2)-para-phenylenediamine and N-phenyl-α-naphthylamine.

The aldehyde may suitably be formaldehyde, acetaldehyde or propionaldehyde. Preferably the aldehyde is formaldehyde, which may be added as monomeric formaldehyde or a polymeric formaldehyde, eg paraformaldehyde. Furthermore formaldehyde may be added as an aqueous solution, ie formalin.

Suitably the amount of aldehyde added may be the stoichiometric amount required to react with all the free >N—H groups present in the dispersant. Alternatively less than the stoichiometric amount may be used. The molar amount of antioxidant added is preferably identical to the molar amount of aldehyde added.

The reaction between the dispersant, the aldehyde and the compound having antioxidant activity may suitably be carried out at a temperature in the range 100° to 175°, preferably 100° to 150° C. and the pressure may suitably be atmospheric.

The condensation may conveniently be carried out by refluxing the dispersant, the aldehyde and the compound having antioxidant activity in the presence of an inert solvent, whilst removing water formed in the reaction overhead. Suitable inert solvents are hydrocarbon solvents such as toluene. At the completion of the reaction the solvent may suitably be removed by distilling under reduced pressure.

According to another aspect of the present invention there is provided a lubricant composition comprising a major proportion of a base oil of lubricating viscosity and a minor proportion of the product as hereinbefore described.

The lubricating oil is preferably a crankcase lubricating oil suitable for use in automobile and diesel engines.

The product as hereinbefore described may be present in the lubricating oil composition in an amount in the range of from 0.1 to 20%, preferably from 0.5 to 10% by weight of the composition.

Additives conventionally employed in the formulation of lubricants may additionally be incorporated in the lubricating oil composition of the present invention.

The lubricating oil additives of the present invention are particularly adapted for use in two-stroke petrol engine lubricating oil compositions which are generally introduced into the engine admixed with the petrol. The base oils used in these compositions are generally SAE 30 and 40 grades. The concentration of the lubricant additive in such compositions is dependent to some extent upon the fuel to oil ratio employed. These ratios range from 16 parts of fuel to one part of oil for many two-wheeled vehicles to 100 to 1 for some outboard engines.

The invention will now be illustrated by the following Examples and Comparison Tests. In the Examples and Tests the following commercially available compounds are used:

A mono-succinimide (MS) prepared by the reaction of one mole of triethylene tetramine (TETA) with two moles of a substituted succinic anhydride, the substituent being a polyisobutenyl group derived from a polyisobutene having a molecular weight of about 1000.

A bis-succinimide (BS) prepared from the same reactants as the mono-succinimide in which the amount of TETA is halved.

2,6-di-tertiary-butyl phenol (2,6-DTBP)
2,6-di-secondary-butyl phenol (2,6-DSBP)

EXAMPLE 1

300 g MS (~0.15 mole), 15 g paraformaldehyde (0.5 mole), 103 g 2,6-DTBP (0.5 mole) and 200 ml toluene were charged to a 1-liter round-bottomed flask equipped with a Dean and Stark condensation system and heated to reflux. The mixture was further heated under reflux for about 2 hours during which time 6 ml of water separated from the mixture. Toluene was removed from the product by stripping under vacuum.

The product was analysed for nitrogen content and its viscosity measured at 210° F. The results are given in the following Table 1.

EXAMPLE 2

Example 1 was repeated except that the reaction conditions were more carefully controlled. The reaction mixture was heated at 90° C. for 2 hours and then the temperature was raised to reflux (~140° C.) for 2 hours during which time 6.8 ml of water separated.

EXAMPLE 3

1000 g MS (0.5 mole), 15 g formaldehyde (0.5 mole), 103 g 2,6 DTBP and 300 ml toluene were charged to a round-bottomed flask equipped with a Dean and Stark condensation system. The mixture was heated to about 90° C. for 2 hours and the temperature then slowly raised to about 145° C. over a 2 hour period. The temperature was then held at this value for 4 hours. 9 ml of water was collected. The product was then vacuum stripped to a base temperature of 125° C. at a pressure of 20 mm Hg to remove toluene. The temperature was then raised to 155° C. to remove unreacted 2,6 DTBP of which very little was obtained.

The product was analysed for nitrogen content and its viscosity at 210° F. measured. The results are given in the following Table 1.

EXAMPLE 4

| Charge: | 1000 g/MS | (0.5 mole) |
| | 60 g formaldehyde | (2 moles) |
| | 412 g 2, 6 DTBP | (2 moles) |
| | 300 ml toluene | |

The reaction procedure was identical to that described in Example 3. 18 ml of water were collected.

Approximately 20 ml 2,6-DTBP were collected during vacuum stripping.

EXAMPLE 5

| Charge: | 1000 g/MS | (0.5 moles) |
| | 300 g formaldehyde | (1 mole) |
| | 206 g 2, 6 DTBP | (1 mole) |
| | 300 ml toluene | |

The procedure used was that described in Example 3. 14 ml water were collected. A trace of 2,6 DTBP was collected during vacuum stripping.

TABLE 1

| Compound | Nitrogen content (wt %) | Basic nitrogen content (wt %) | Viscosity at 210° F. (cS) |
| --- | --- | --- | --- |
| MS | 2.10 | 1.27 | 191 |
| Product of Ex 3 | 2.04 | 0.98 | 154.4 |
| Product of Ex 4 | 1.48 | 0.50 | 66.2 |

EXAMPLE 6

800 g MS, 48 g formaldehyde and 333 g 2,6-DTBP (ie a molar ratio of 1:4:4) were mixed with 2000 ml toluene in a roundbottomed flask equipped with a Dean and Stark condensor. The mixture was heated at 65° C. for 14 hours. The temperature was then raised and the mixture refluxed for a further 14 hours whilst water was recovered. The product was then vacuum stripped to a base temperature of 140° C., 20 mm Hg pressure.

The product was analysed for nitrogen content and its alkalinity value (AV) and viscosity at 210° F. measured. The results are given in Table 2.

EXAMPLE 7

The procedure of Example 6 was followed using 700 g MS, 31.5 g formaldehyde and 216 g 2,6-DTBP (ie a molar ratio of 1:3:3).

EXAMPLE 8

The procedure of Example 6 was followed using 800 g MS, 24 g formaldehyde and 164.8 g 2,6-DTBP (ie a molar ratio of 1:2:2).

EXAMPLE 9

The procedure of Example 6 was followed using 1000 g MS, 60 g formaldehyde and 412 g 2,6-DSBP (ie a molar ratio of 1:4:4).

TABLE 2

| Compound | Nitrogen content (wt %) | AV (mg KOH/g) | Viscosity at 210° F. (cS) | Water collected during preparation (ml) |
| --- | --- | --- | --- | --- |
| Product of Ex 6 | 1.58 | 26.9 | 101.4 | 24.5 |
| Product of Ex 7 | 1.63 | 30.4 | 101.5 | 17.5 |
| Product of Ex 8 | 1.76 | 29.0 | 119.6 | 16.0 |
| Product of Ex 9 | 1.54 | 26.5 | 92.3 | 32.0 |

EXAMPLE 10

The antioxidant properties of some of the products were tested in an Air Panel Coker Test which is useful as a screening test for determining the effectiveness of the products under oxidation conditions.

Air Panel Coker Test

Into a specially designed glassware rig was placed 75 g of a compounded oil containing a fixed amount of the product to be tested. The oil was circulated over a polished metal panel held at 300° C. for 7 hours at a rate of approximately 100 ml/hour. Simultaneously 2 liter/hour of dry air was passed over the metal panel to provide an oxidising environment. The oxidised product was then filtered and the weight of the matter deposited was taken as a measure of the effectiveness of the product ie the greater the weight of the deposit the less effective was the product.

The time for the deposit in the form of a varnish to appear on the inside of the glassware was also measured. This is a measure of the dispersancy properties of the product.

Finally the ease of cleaning of the deposit off the glassware was assessed on a scale varying from very easy (VE), easy (E) to very difficult (D).

Oil formulation

The product of Example 3 was compounded in a lubricating oil containing also magnesium sulphonate, zinc thiophosphates and a viscosity index improver to 15 W 50 grade.

The results are given in Table 3.

EXAMPLE 11

Example 10 was repeated except that the product of Example 3 was replaced by the product of Example 4.

Comparison Test 1

Example 10 was repeated except that the product of Example 3 was replaced by MS which is not a compound according to the present invention.

Comparison Test 2

Example 10 was repeated except that the product of Example 3 was replaced by a mixture of MS and 2,6 DTBP, which mixture is not according to the present invention.

Comparison Test 3

Example 10 was repeated except that the product of Example 3 was replaced by a mixture of MS and 0.5% by weight of a commercially available antioxidant, which mixture is not according to the present invention.

TABLE 3

| Example | Weight of deposit (mg) | Time for appearance of deposit (hours) | Ease of cleaning deposit |
|---|---|---|---|
| 10 | 9.8 | 2.5 | E |
| 11 | 16.3 | Glass clean | — |
| Comparison Test 1 | 40.8 | ½ | D |
| Comparison Test 2 | 17.4 | 2.0 | D |
| Comparison Test 3 | 15.8 | 1 | D |

From an examination of Table 3 it can be seen that the product of Example 3 was extremely effective as an antioxidant and in dispersing the deposit compared with the commercially available succinimide product of Comparison Test 1 and also effective when compared with the admixtures of Comparison Tests 2 and 3. Whilst the product of Example 4 was very effective both in antioxidant and dispersant activity compared with the unreacted mono-succinimide its antioxidant activity was comparable with that of the mixtures of Comparison Tests 2 and 3. On the other hand its dispersant activity was very much improved since the deposit never accumulated on the glass surface.

EXAMPLE 12

Example 10 was repeated except that the product of Example 3 was replaced by the product of Example 6 in an amount of 8.2% bw.

The results are given in Table 4.

EXAMPLE 13

Example 10 was repeated except that the product of Example 3 was replaced by the product of Example 7 in an amount of 8.0% bw.

The results are given in Table 4.

Comparison Test 4

Example 10 was repeated except that the product of Example 3 was replaced by 6.3% bw MS+0.2% bw of a commercially available antioxidant.

The results are given in Table 4.

Comparison Test 5

Comparison Test 4 was repeated except that the amount of antioxidant was increased to 1.9% bw.

The results are given in Table 4.

Comparison Test 6

Example 10 was repeated except that the product of Example 3 was replaced by 6.3% bw MS+1.9% bw, 2,6 DTBP.

The results are given in Table 4.

TABLE 4

| Example | Weight of deposit (mg) | Time for appearance of black deposit (hours) | Ease of cleaning deposit |
|---|---|---|---|
| Comp Test 4 | 40 | 1 | Not determined |
| Comp Test 5 | 15.9 | 3 | " |
| Comp Test 6 | 12.6 | 4 | " |
| 12 | 9.4 to 14.7* | 5 | " |
| 13 | 2.1 | Glass clean | — |

*The lowest and highest values recorded for a number of determinations.

The results in Table 4 indicate an improvement in performance by the chemically modified succinimide. It was also observed during the tests reported in Table 4 that there was a tendency for 2,6 DTBP to separate out from the physical mixture but not from the chemically bound products.

EXAMPLE 14

Oxygen Absorption Test

A sample of the fully formulated oil was shaken in an oxygen environment (sealed system) at a temperature of 190° C. and the rate of oxygen absorption with time was measured. The results are given in Table 5.

Oil Formulation 6.3% bw of the product of Example 6 was compounded in a 100 Solvent Neutral base oil with magnesium sulphonate, zinc dithiophosphate and an oxidation accelerator, iron octoate.

EXAMPLE 15

Example 14 was repeated except that the amount of the product of Example 6 in the formulation was increased to 8.7% bw.

Comparison Test 7

Example 14 was repeated except that the product of Example 6 was replaced by 6.3% bw MS.

Comparison Test 8

Example 14 was repeated except that the product of Example 6 was replaced by 6.3% bw MS+0.2% bw of a commercially available antioxidant.

Comparison Test 9

Comparison Test 8 was repeated except that the amount of antioxidant was increased to 2.4% bw.

Comparison Test 10

Example 14 was repeated except that the product of Example 6 was replaced by 6.3% bw MS+2.4% bw 2,6 DTBP.

TABLE 5

| Example | Time in minutes to absorb | | |
|---|---|---|---|
| | 1 unit of oxygen | 3 units of oxygen | 5 units of oxygen |
| Comp Test 7 | 8.6 | 9.1 | 9.4 |
| Comp Test 8 | 10.0 | 11.5 | 12.1 |
| Comp Test 9 | 12.1 | 15.8 | 17.7 |
| Comp Test 10 | 7.9 | 15.7 | 20.5 |
| 14 | 17.1 | 25.7 | 29.2 |
| 15 | 18.2 | 28.9 | 35.9 |

With reference to the above Table the results demonstrate that the products of the present invention absorb oxygen at a lower rate than the physical admixtures of the Comparison Tests.

ENGINE TESTS

EXAMPLE 16-FORMULATION 6.3% bw of the product of Example 6 was compounded in a lubricating oil with magnesium sulphonate, zinc dithiophosphate and a viscosity index improver to 15 W 50 grade.

Test

The formulation was tested in the Petter AVB test over a 50 hour period.

The results are given in Table 6.

EXAMPLE 17

Example 16 was repeated except that the product of Example 6 in the oil formulation was replaced by 8.1% bw of the product of Example 7.

EXAMPLE 18

Example 16 was repeated except that the product of Example 6 in the oil formulation was replaced by 7.5% bw of the product of Example 8.

Comparison Test 11

Example 16 was repeated except that the product of Example 6 in the oil formulation was replaced by 6.3% bw MS+0.2% bw of a commercially available antioxidant.

TABLE 6

| Example | Total Rating | Ring Belt Merit (RBM) |
|---|---|---|
| Comp Test 11 | 56 | 5.0 |
| 16 | 50 | 4.6 |
| 17 | 46 | 3.7 |

TABLE 6-continued

| Example | Total Rating | Ring Belt Merit (RBM) |
|---|---|---|
| 18 | 46 | 3.8 |

The results in Table 6 indicate that the products of the present invention are comparable in engine performance in the Petter AVB test with the physical admixture of Comparison Test 11.

EXAMPLE 19

Formulation 8.4% bw of the product of Example 6 was compounded in a lubricating oil with magnesium sulphonate, zinc dithiophosphate and a viscosity index improver to 15 W 50 grade.

Test

The formulation was tested in the Caterpillar 1-H2 test.

The results are given in Table 7.

Comparison Test 12

Example 19 was repeated except that the product of Example 6 in the formulation was replaced by 6.3% bw MS+0.2% bw of a commercially available antioxidant.

TABLE 7

| Example | % Top Groove Fill (TGF) | Weighted Total Demerit (WTD) | Duration of test (hours) |
|---|---|---|---|
| Comp Test 12 | 66 | 228 | 240 |
| 19 | 13 | 45 | 120 |

EXAMPLE 20

5040 g of MS, 2098 g of 2,6-DTBP and 1700 ml toluene were charged to a reaction flask equipped with a stirrer, thermometer and Dean and Stark condensation system. 302.4 g of paraformaldehyde were added over a 10 minute period. The mixture was then heated to 65° to 70° C. for approximately 20 hours. At the end of this period the temperature was raised slowly to 140° C. and held at reflux for approximately 20 hours. During this period a further 800 mls of toluene were added. A total of 130 mls of water were collected in the condensation system.

Finally the mixture was vacuum stripped to a base temperature of 120° C., 20 mm Hg pressure.

During the course of the preparation the contents of the reaction flask were regularly sampled and the samples analysed for unreacted 2,6-DTBP by Gas Liquid Chromatography. The results are given in the following Table 8.

TABLE 8

| Time of sampling (hours) | 2, 6-DTBP content % | Unknown % | Comment |
|---|---|---|---|
| 0 | 23.6 | 0 | At start-up |
| 20 | 16.4 | 0.9 | |
| 40 | 8.0 | 2.6 | |
| 44 | 9.4 | 2.3 | After vacuum stripping |

No methylene-bridged 2,6-DTBP product was observed.

We claim:

1. A lubricating oil additive providing for the release of anti-oxidants in lubricating oil compositions comprising the product obtained by reacting a substituted succinimide dispersant having free >NH groups in its molecular structure, an aldehyde and an anti-oxidant compound capable of condensing with an aldehyde and said dispersant, selected from secondary aromatic amines, wherein an aldehyde and said anti-oxidant compound are reacted in about equimolar amounts with said dispersant at a temperature in the range of about 100°–175° C. to chemically bond said anti-oxidant compound to said dispersant in a manner permitting the release of said anti-oxidant by scission of the chemical bond binding it to said dispersant at elevated temperatures.

2. A lubricating oil additive according to claim 1 wherein said dispersant in the product obtained by reacting a substituted succinic acid having the structural formula:

or a substituted succinic anhydride having the structural formula:

in which structural formulae (I) and (II) the substituent R is a large substantially aliphatic hydrocarbon radical having from 30 to 200 carbon atoms, with at least one-half an equivalent amount of an amine of formula:

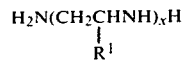

in which formula (III) the substituent $R^1$ is selected from $C_1$ to $C_6$ alkyl radicals and hydrogen, at a sufficiently elevated temperature to effect formation of said product and to remove the water formed in the reaction.

3. A lubricating oil additive according to claim 2 wherein said substituent R in the formulae (I) and (II) is a polyisobutylene group having at least 50 carbon atoms.

4. A lubricating oil additive according to claim 2 wherein said amine of formula (III) is selected from ethylene diamine, diethylene triamine, triethylene tetramine and pentaethylene hexamine.

5. A lubricating oil additive according to claim 1 wherein said dispersant is the product obtained by reacting at a temperature in the range 100° to 160° C. one mole of a substituted succinic anhydride wherein said substituent is derived from a polyisobutene of molecular weight about 1000 with either one or two moles of triethylene tetramine.

6. A lubricating oil additive according to claim 1 wherein said secondary aromatic amine is selected from N-phenyl-β-N-naphthylamine, N,N¹-di-(naphthyl-2)-para-phenylenediamine and N-phenyl-α-naphthylamine.

7. A lubricating oil additive according to claim 1 wherin said aldehyde is formaldehyde.

8. A lubricating oil composition comprising a major proportion of a base oil of lubricating viscosity and from 0.1 to 20 percent lubricating oil additive according to claim 1.

9. A lubricating oil composition according to claim 8 wherein said lubricating oil additive is present in an amount in the range of from 0.1 to 20% by weight of said composition.

10. A lubricating oil composition according to claim 8 wherein said base oil is an SAE 30 or SAE 40 grade oil.

* * * * *